United States Patent
Shin

(10) Patent No.: US 10,498,881 B2
(45) Date of Patent: Dec. 3, 2019

(54) CREATING AND DISPLAYING SHORTCUT TO ANOTHER APPLICATION TO LINK CONTENTS OF DIFFERENT APPLICATIONS TO EACH OTHER

(71) Applicant: LG ELECTRONICS INC., Seoul (KR)

(72) Inventor: Yongkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 338 days.

(21) Appl. No.: 15/423,517

(22) Filed: Feb. 2, 2017

(65) Prior Publication Data
US 2017/0149959 A1   May 25, 2017

Related U.S. Application Data

(63) Continuation of application No. 14/279,036, filed on May 15, 2014, now Pat. No. 9,600,154.

(30) Foreign Application Priority Data
May 15, 2013   (KR) .................. 10-2013-0054790

(51) Int. Cl.
G06F 3/048   (2013.01)
H04M 1/725   (2006.01)
(Continued)

(52) U.S. Cl.
CPC ...... *H04M 1/72583* (2013.01); *G06F 3/0482* (2013.01); *G06F 3/0488* (2013.01);
(Continued)

(58) Field of Classification Search
CPC ......... H04M 1/72583; H04M 1/72547; H04M 2201/42; H04M 1/27455; G06F 3/04842; G06F 3/0488; G06F 3/0482
See application file for complete search history.

(56) References Cited

U.S. PATENT DOCUMENTS

2009/0210778 A1*   8/2009   Kulas .................. G06Q 10/107
                                                        715/201
2010/0162167 A1   6/2010   Stallings et al.
(Continued)

*Primary Examiner* — Jeanette J Parker
(74) *Attorney, Agent, or Firm* — Lee, Hong, Degerman, Kang & Waimey

(57) ABSTRACT

A mobile terminal and controlling method thereof are disclosed, by which creation, editing and sharing of a shortcut to such various informations having similarities as applications, files web documents, contacts and the like can be facilitated. The present invention includes selecting a $1^{st}$ content through a $1^{st}$ application, selecting a $2^{nd}$ content corresponding to a $2^{nd}$ application in response to an input of a link command, creating a link information between the $1^{st}$ content and the $2^{nd}$ content, displaying a $1^{st}$ link corresponding to the $1^{st}$ content when the $2^{nd}$ content is displayed or displaying a $2^{nd}$ link corresponding to the $2^{nd}$ content when the $1^{st}$ content is displayed, and displaying the $1^{st}$ content through the $1^{st}$ application if the $1^{st}$ link is selected or displaying the $2^{nd}$ content through the $2^{nd}$ application if the $2^{nd}$ link is selected.

16 Claims, 14 Drawing Sheets

(51) Int. Cl.
*G06F 3/0484* (2013.01)
*G06F 3/0482* (2013.01)
*G06F 3/0488* (2013.01)
*H04M 1/2745* (2006.01)

(52) U.S. Cl.
CPC .... *G06F 3/04842* (2013.01); *H04M 1/72547* (2013.01); *H04M 1/27455* (2013.01); *H04M 2201/42* (2013.01)

(56) References Cited

U.S. PATENT DOCUMENTS

| | | | |
|---|---|---|---|
| 2012/0071208 A1 | 3/2012 | Lee et al. | |
| 2012/0169634 A1* | 7/2012 | Lee | G06F 3/04883 345/173 |
| 2013/0145240 A1* | 6/2013 | Anderson | G06F 3/0483 715/201 |
| 2014/0101617 A1* | 4/2014 | Yang | G06K 9/00288 715/846 |
| 2014/0157166 A1* | 6/2014 | Choi | G06F 3/04817 715/769 |

* cited by examiner

FIG. 5
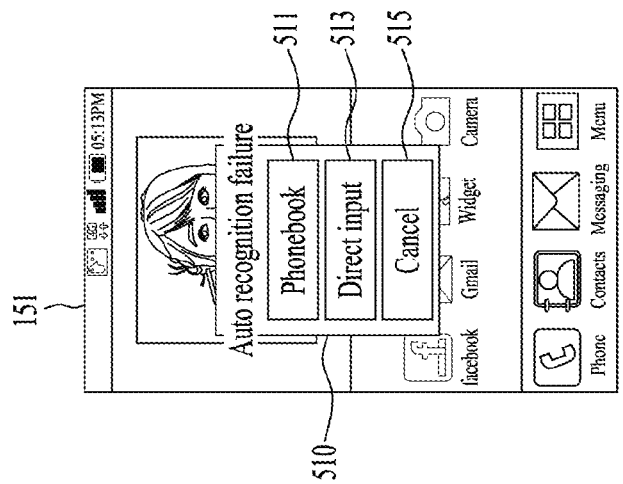
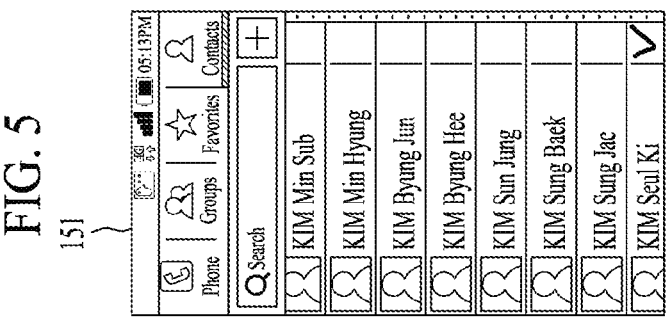
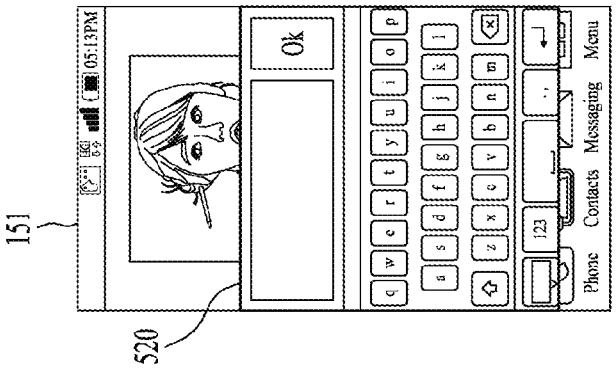

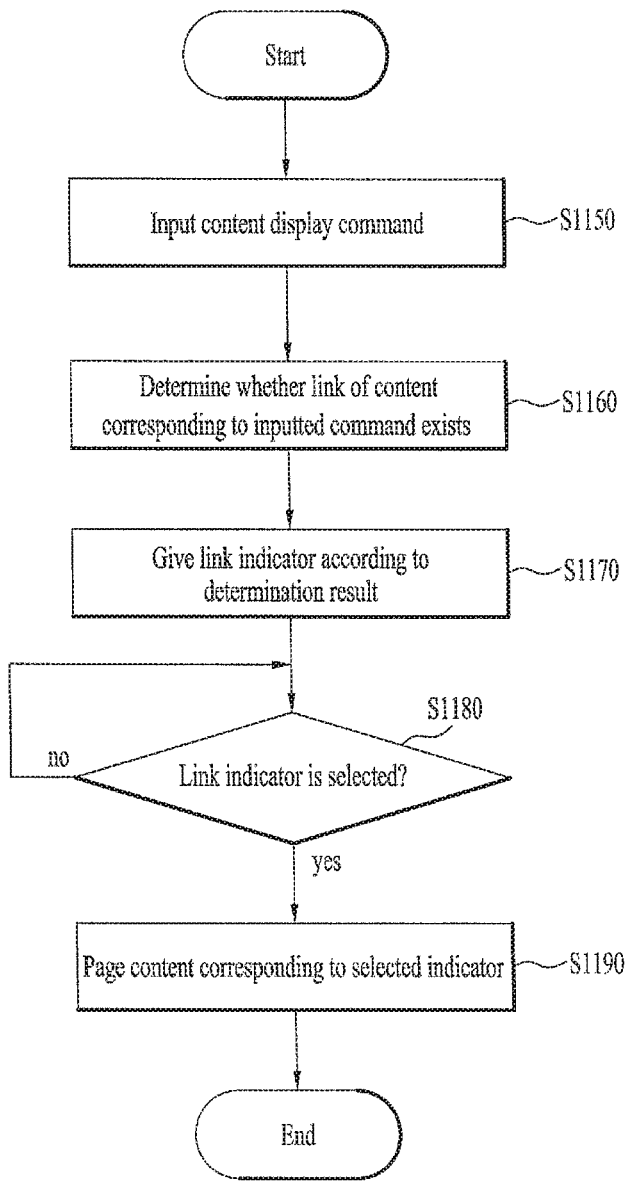

CREATING AND DISPLAYING SHORTCUT TO ANOTHER APPLICATION TO LINK CONTENTS OF DIFFERENT APPLICATIONS TO EACH OTHER

CROSS-REFERENCE TO RELATED APPLICATIONS

This application is a continuation of U.S. patent application Ser. No. 14/279,036 filed on May 15, 2014, now U.S. Pat. No. 9,600,154, which claims the benefit of earlier filing date and right of priority to Korean Patent Application No. 10-2013-0054790, filed on May 15, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating creation, editing and sharing of a shortcut to such various informations having similarities as applications, files web documents, contacts and the like.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, as a mobile terminal of a smart type is widely used, various applications can be run in the mobile terminal. Hence, a user is able to access a single information in various ways. However, if applications are different from each other in type or property, it is inconvenient to manage/access informations separately despite the informations have similarities in-between.

SUMMARY OF THE INVENTION

Accordingly, the present invention is directed to a mobile terminal and controlling method thereof that substantially obviate one or more problems due to limitations and disadvantages of the related art.

One object of the present invention is to provide a mobile terminal and controlling method thereof, by which a shortcut to various applications related to informations having similarities can be created and managed conveniently and easily.

Another object of the present invention is to provide a mobile terminal and controlling method thereof, by which contents of different applications are linked to each other to provide a function of reading the linked contents conveniently and a function of switching the linked contents to each other.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a touchscreen and a controller controlling an application, the controller displaying an active image of the application on the touchscreen, the controller, if a $1^{st}$ content through a $1^{st}$ application is selected and a $2^{nd}$ content corresponding to a $2^{nd}$ application is selected in response to an input of a link command, creating a link information between the $1^{st}$ content and the $2^{nd}$ content, the controller displaying a $1^{st}$ link corresponding to the $1^{st}$ content when the $2^{nd}$ content is displayed, the controller displaying a $2^{nd}$ link corresponding to the $2^{nd}$ content when the $1^{st}$ content is displayed, the controller displaying the $1^{st}$ content through the $1^{st}$ application if the $1^{st}$ link is selected, the controller displaying the $2^{nd}$ content through the $2^{nd}$ application if the $2^{nd}$ link is selected.

In another aspect of the present invention, as embodied and broadly described herein, as embodied and broadly described herein, a method of controlling a mobile terminal according to one embodiment of the present invention includes the steps of selecting a $1^{st}$ content through a $1^{st}$ application, selecting a $2^{nd}$ content corresponding to a $2^{nd}$ application in response to an input of a link command, creating a link information between the $1^{st}$ content and the $2^{nd}$ content, displaying a $1^{st}$ link corresponding to the $1^{st}$ content when the $2^{nd}$ content is displayed or displaying a $2^{nd}$ link corresponding to the $2^{nd}$ content when the $1^{st}$ content is displayed, and displaying the $1^{st}$ content through the $1^{st}$ application if the $1^{st}$ link is selected or displaying the $2^{nd}$ content through the $2^{nd}$ application if the $2^{nd}$ link is selected.

In another aspect of the present invention, as embodied and broadly described herein, a mobile terminal according to another embodiment of the present invention includes a touchscreen and a controller controlling an application, the controller displaying an active image of the application on the touchscreen, the controller, after selecting a $1^{st}$ object through a $1^{st}$ application, if a $2^{nd}$ object corresponding to a $2^{nd}$ application approaches the $1^{st}$ object, determining an information of the $2^{nd}$ application related to the $1^{st}$ object, the controller creating a $3^{rd}$ object including at least one portion of the $2^{nd}$ object around the $1^{st}$ object based on the determined information, the controller if the at least one portion of the $2^{nd}$ object is selected from the $3^{rd}$ object, displaying the determined information through the $2^{nd}$ application.

In another aspect of the present invention, as embodied and broadly described herein, a method of controlling a mobile terminal according to another embodiment of the present invention includes the steps of selecting a $1^{st}$ object through a $1^{st}$ application, if a $2^{nd}$ object corresponding to a $2^{nd}$ application approaches the $1^{st}$ object, determining an information of the $2^{nd}$ application related to the $1^{st}$ object, creating a $3^{rd}$ object including at least one portion of the $2^{nd}$ object around the 1st object based on the determined information, and if the at least one portion of the 2nd object is selected from the 3rd object, displaying the determined information through the 2nd application.

Accordingly, the present invention provides the following effects and/or advantages.

First of all, creation and management of a shortcut to various applications having similarities in-between can be facilitated. In particular, if the created shortcut is selected, a function related to the similarities can be activated directly and conveniently in an application corresponding to the selected shortcut.

Secondly, since contents of different applications are linked to each other, the contents can be quickly switched and read by content unit irrespective of types of the applications. Therefore, it is able to minimize the inconvenience in selecting the contents by running each of the different applications one by one.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram for one example of a method of specifying a 2nd application information in response to a user's selection in a mobile terminal according to one embodiment of the present invention;

FIG. 11B is a diagram for one example of a process for utilizing the created link in a mobile terminal according to another embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the invention only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
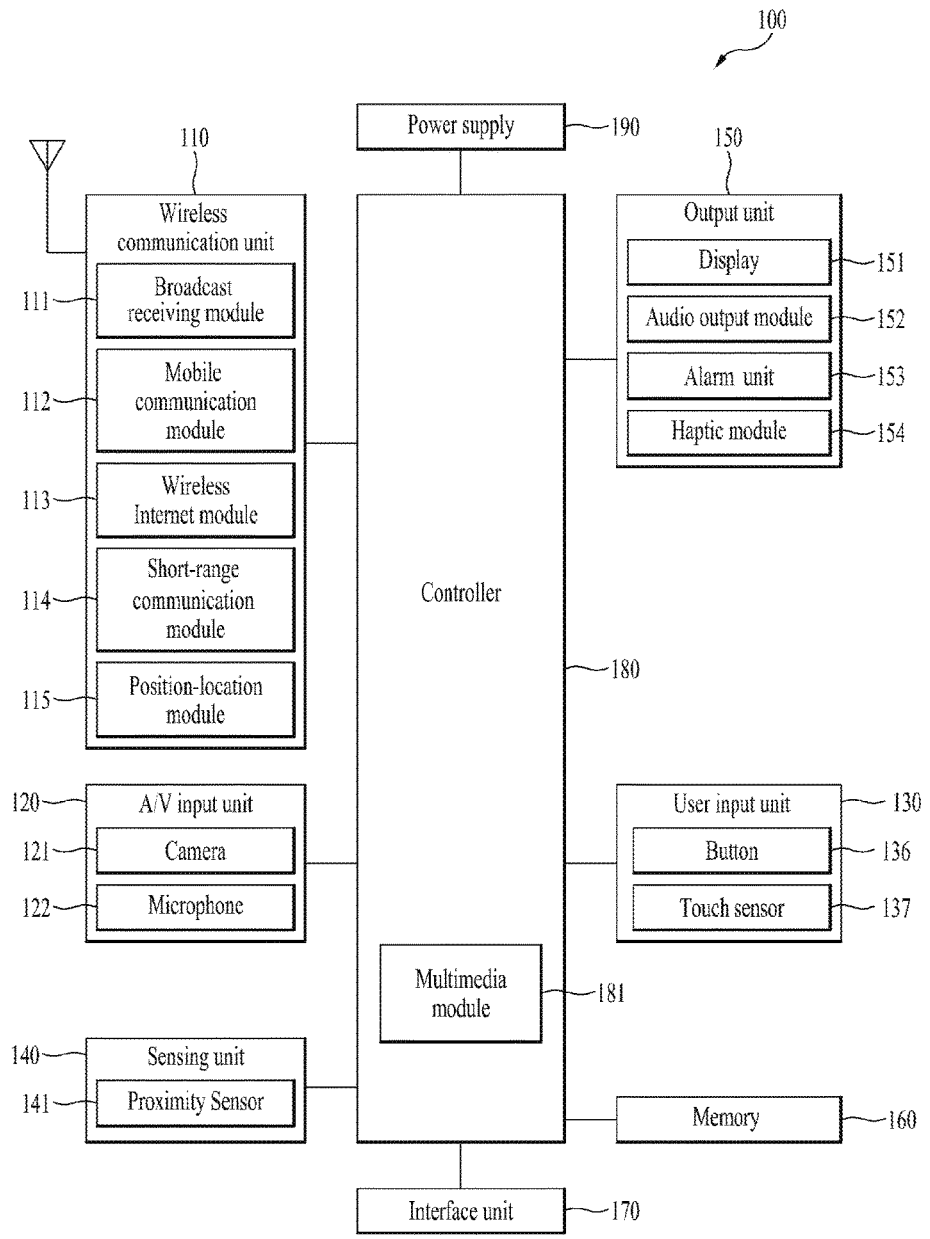
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, a projector module, etc.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
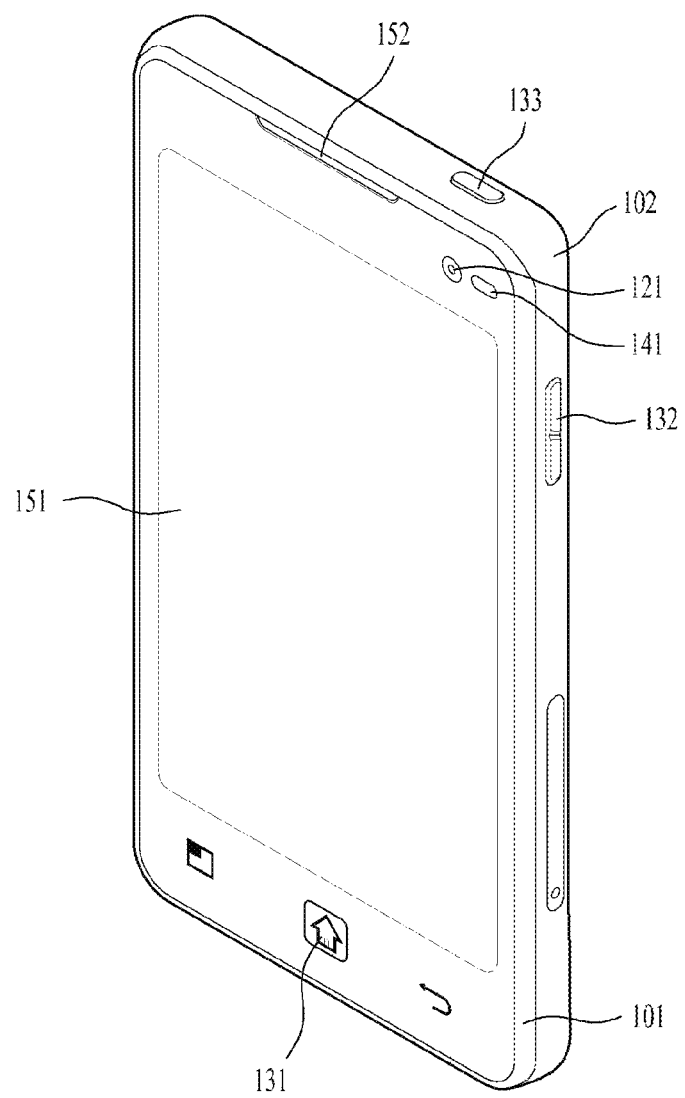
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following invention will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this invention, a graphic displayed on a display unit is named a cursor and such a physical means for performing a touch, a proximity touch, a gesture and the like as a finger, a stylus pen and the like is named a pointer.

Shortcut to Various Applications Related to Information Having Similarities

A method of creating and utilizing a shortcut to various applications related to an information having similarities and mobile terminal for performing the same according to one embodiment of the present invention are described in detail with reference to the accompanying drawings as follows.

Figure 3:
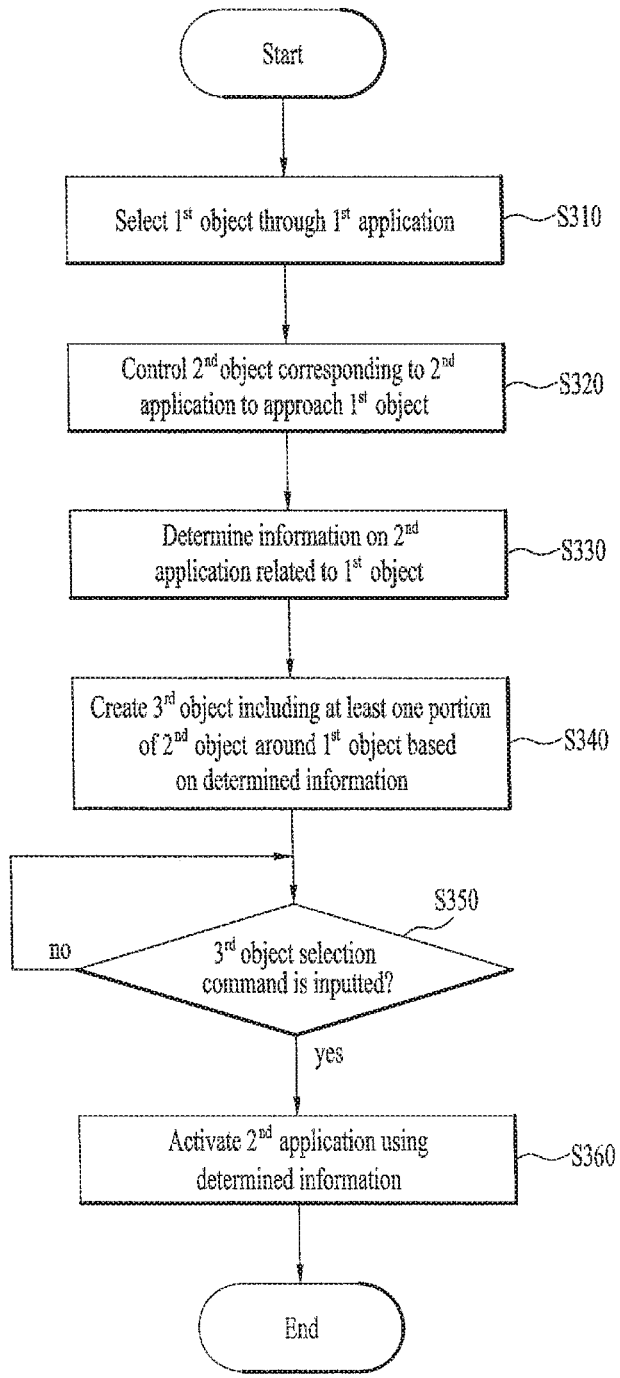
FIG. 3 is a flowchart for one example of a process for creating a shortcut to a plurality of applications related to an information having similarities and utilizing the created shortcut in a mobile terminal according to one embodiment of the present invention.

FIG. 3 is a flowchart for one example of a process for creating a shortcut to a plurality of applications related to an information having similarities and utilizing the created shortcut in a mobile terminal according to one embodiment of the present invention.

Referring to FIG. 3, a $1^{st}$ object can be selected through a $1^{st}$ application [S310]. In this case, the $1^{st}$ object may mean a storage unit of information, which can be created, read, played, modified, saved and/or deleted through the $1^{st}$ application, or a display object corresponding to the information storage unit. In particular, the $1^{st}$ object may include one of a schedule information, a contact information, a text, a webpage, an SNS posting, a multimedia file itself, a corresponding icon, a corresponding widget, and the like.

After the $1^{st}$ object has been selected, a $2^{nd}$ object corresponding to a $2^{nd}$ application approaches the $1^{st}$ object closely [S320]. In this case, the $2^{nd}$ object may include an icon or widget corresponding to the $2^{nd}$ application. Moreover, if the $2^{nd}$ object approaches the $1^{st}$ object closely, it may mean that the $2^{nd}$ object approaches the $1^{st}$ object in a prescribed distance in response to a user inputted command for moving the $2^{nd}$ object or that the $2^{nd}$ object comes in contact with the $1^{st}$ object in part at least.

Hence, the controller 180 can determine information of the $2^{nd}$ application related to the $1^{st}$ object [S330]. For the relation to the $1^{st}$ object in determining the information of the $2^{nd}$ application, the controller 180 may consider a keyword (e.g., a name, etc.) included in the object, a video or audio information included in the object, a preset information of the $2^{nd}$ application for the $1^{st}$ object and the like. If the controller needs more information required for the determination or determines a plurality of informations of the $2^{nd}$ application, a user may select the corresponding information in direct.

Once the determination is completed, the controller 180 can create a $3^{rd}$ object including at least one portion of the $2^{nd}$ object around the $1^{st}$ object based on the determined information [S340]. In particular, it is able to create the $3^{rd}$ object that performs a shortcut function of accessing the information of the $2^{nd}$ application related to the information of the $1^{st}$ object. As the $1^{st}$ object and at least one portion of the $2^{nd}$ object around the $1^{st}$ object are included in the $3^{rd}$ object, a user can be visually informed of the shortcut function.

Thereafter, if the $3^{rd}$ object is selected [S350], the controller 180 can activate the $2^{nd}$ application using the determined information [S360].

In the following description, a method of the $3^{rd}$ object is described in detail with reference to FIG. 4 and FIG. 5.

Figure 4:
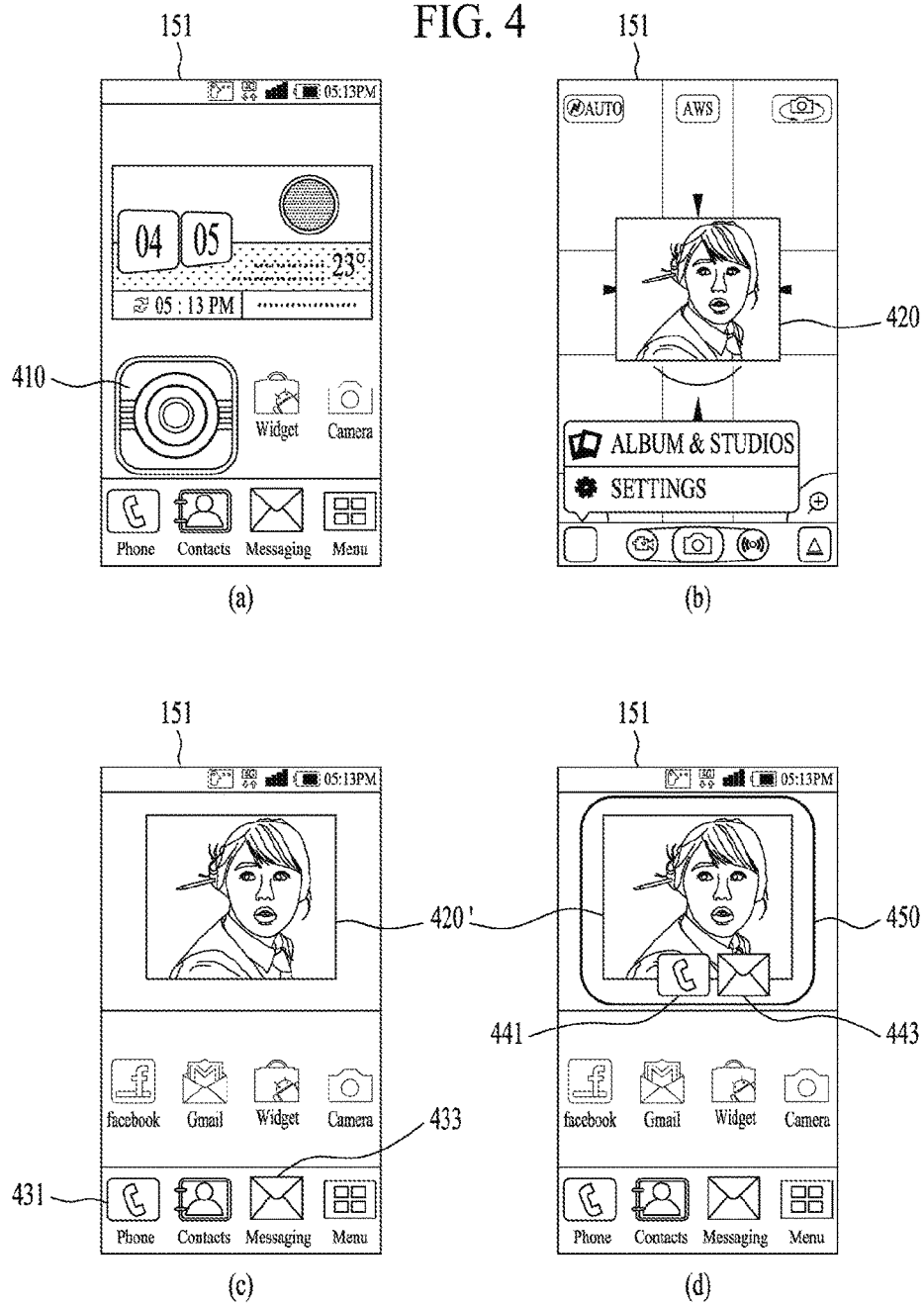
FIG. 4 is a diagram for one example of a method of creating a shortcut to an application having similarities in a mobile terminal according to one embodiment of the present invention.

FIG. 4 is a diagram for one example of a method of creating a shortcut to an application having similarities in a mobile terminal according to one embodiment of the present invention.

Referring to FIG. 4, assume that a $1^{st}$ application is a camera application. And, assume that $2^{nd}$ applications include a phone application and a text message application.

If an icon 410 corresponding to the camera application is selected [FIG. 4 (a)], it is able to photograph an image 420 [FIG. 4 (b)]. After completion of the image photographing, if a command for creating a $3^{rd}$ object is inputted, the photographed image 420 is selected as a $1^{st}$ object 420' and can be then displayed on a prescribed region of a home screen [FIG. 4 (c)]. Of course, instead of photographing an image through the camera application, a prescribed one or portion of images previously saved in the memory 160 can be selected through a gallery application. And, the command for creating the $3^{rd}$ object may be inputted before the $1^{st}$ object is selected.

Thereafter, if an icon 431 (i.e., $2^{nd}$ object) corresponding the phone application and an icon 433 (i.e., $2^{nd}$ object) corresponding to the message application among icons existing on a home screen are sequentially dragged to the $1^{st}$ object 420', the controller 180 determines informations of the applications respectively related to the image and is then able to control the $3^{rd}$ object 450, on which the icons 441 and 443 dragged around the $1^{st}$ object 420' are displayed, to be created [FIG. 4 (d)]. In determining the related information, the controller 180 can determine whether an item corresponding to an identification information (e.g., a file name) of the image exists by searching the memory 160 for a contact. If a character photo information is saved in a phonebook as well, the controller 180 can determine that the selected image corresponds to which contact by face recognition. Hence, the contact corresponding to the character of the image can be saved as the information related to the $1^{st}$ object in each of the icon 441 and the icon 443. Of course, the contact is set as the information related to the $1^{st}$ object and information on communication with the corresponding contact can be set as the information related to the 1$^{st}$ object as well. For instance, in case of the phone application, information of a history of calls exchanged with a specific contact can be set as the information related to the 1$^{st}$ object. For another instance, in case of the text application, each text message exchanged with a specific contact or a text message having an image, in which the same character of the 1$^{st}$ object image is included, attached thereto can be set as the information related to the 1$^{st}$ object.

After the 1$^{st}$ object has been selected, a display location of the selected 1$^{st}$ object is the home screen, as shown in FIG. 4, the 3$^{rd}$ object can be configured as a widget. Of course, the display location of the selected 1$^{st}$ object may be non-limited by the home screen and can be set to any locations capable of selecting/accessing the 2$^{nd}$ object.

On the other hand, the controller 180 may not be able to decide the information of the 2$^{nd}$ application corresponding to the 1$^{st}$ object. For this, an operation of the mobile terminal is described in detail with reference to FIG. 5 as follows.

FIG. 5 is a diagram for one example of a method of specifying a 2$^{nd}$ application information in response to a user's selection in a mobile terminal according to one embodiment of the present invention.

In FIG. 5, when the icon 431 corresponding to the phone application in the situation shown in FIG. 4 (c) approaches the 1$^{st}$ object image 420', assume a case that the controller 180 fails in determining the information of the phone application related to the 1$^{st}$ object image, i.e., the controller 180 fails in automatic recognition.

Referring to FIG. 5 (a), as the controller 180 fails in the automatic recognition, a popup window 510 including a menu for enabling a user to directly select information of the phone application can be displayed on the touchscreen 151. Since the phone application is the application related to a contact, the controller 180 can control a phonebook menu 511, a direct contact input menu 513, a cancel menu 515 and the like to be included in the popup window 510. If the phonebook menu 511 is selected, referring to FIG. 5 (b), a contact list is displayed. If a prescribed contact is selected from the contact list, the controller 180 can control the selected contact to be set as the information related to the 1$^{st}$ object image. If the direct contact input menu 513 is selected in the situation shown in FIG. 5 (a), referring to FIG. 5 (c), the controller 180 can display an input window 520 including a virtual keypad for receiving a direct input of a contact information from a user.

In the following description, utilization of the created 3$^{rd}$ object is described in detail with reference to FIG. 6.

Figure 6:
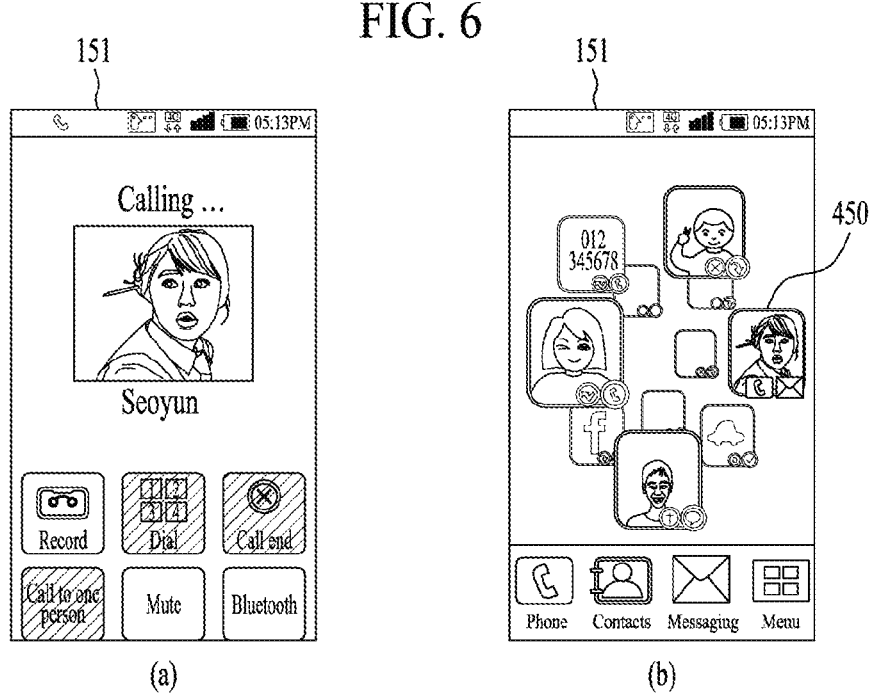
FIG. 6 is a diagram for one example of a method of utilizing a shortcut object created in a mobile terminal according to one embodiment of the present invention.

FIG. 6 is a diagram for one example of a method of utilizing a shortcut object created in a mobile terminal according to one embodiment of the present invention.

Referring to FIG. 6, if the icon 441 corresponding to the phone application is selected from the shortcut object 450 shown in FIG. 4 (d), an operation of making a phone call to the contact determined as related to the 1$^{st}$ object image 420' can be performed and the 1$^{st}$ object image can be displayed on the touchscreen 151 [FIG. 6 (a)]. On the other hand, if the icon 441 corresponding to the phone application is selected, a list of call logs with the determined contact can be displayed [not shown in the drawing].

Meanwhile, if the icon 443 corresponding to the text application is selected from the shortcut object 450 shown in FIG. 4 (d), a contact corresponding to a character mentioned in a text message exchanged with the determined contact and images corresponding to contacts as common recipients of a specific group message can be displayed around the 3$^{rd}$ object. In doing so, if the image corresponding to the contact has a higher frequency of appearance in the message, it can be displayed in bigger size. On the other hand, if the icon 443 corresponding to the text application is selected from the shortcut object 450, a composition of a text message to the determined contact can be initiated or a list or thread of messages exchanged with the determined contact may be displayed [not shown in the drawing].

Of course, if the 1$^{st}$ object image 420' is selected from the shortcut object 450, the corresponding image can be displayed through the gallery application.

Meanwhile, according to another example of the present embodiment, after a 2$^{nd}$ application and information related to the 2$^{nd}$ application have been selected, a 1$^{st}$ object can be selected. This is described in detail with reference to FIG. 7 as follows.

Figure 7:
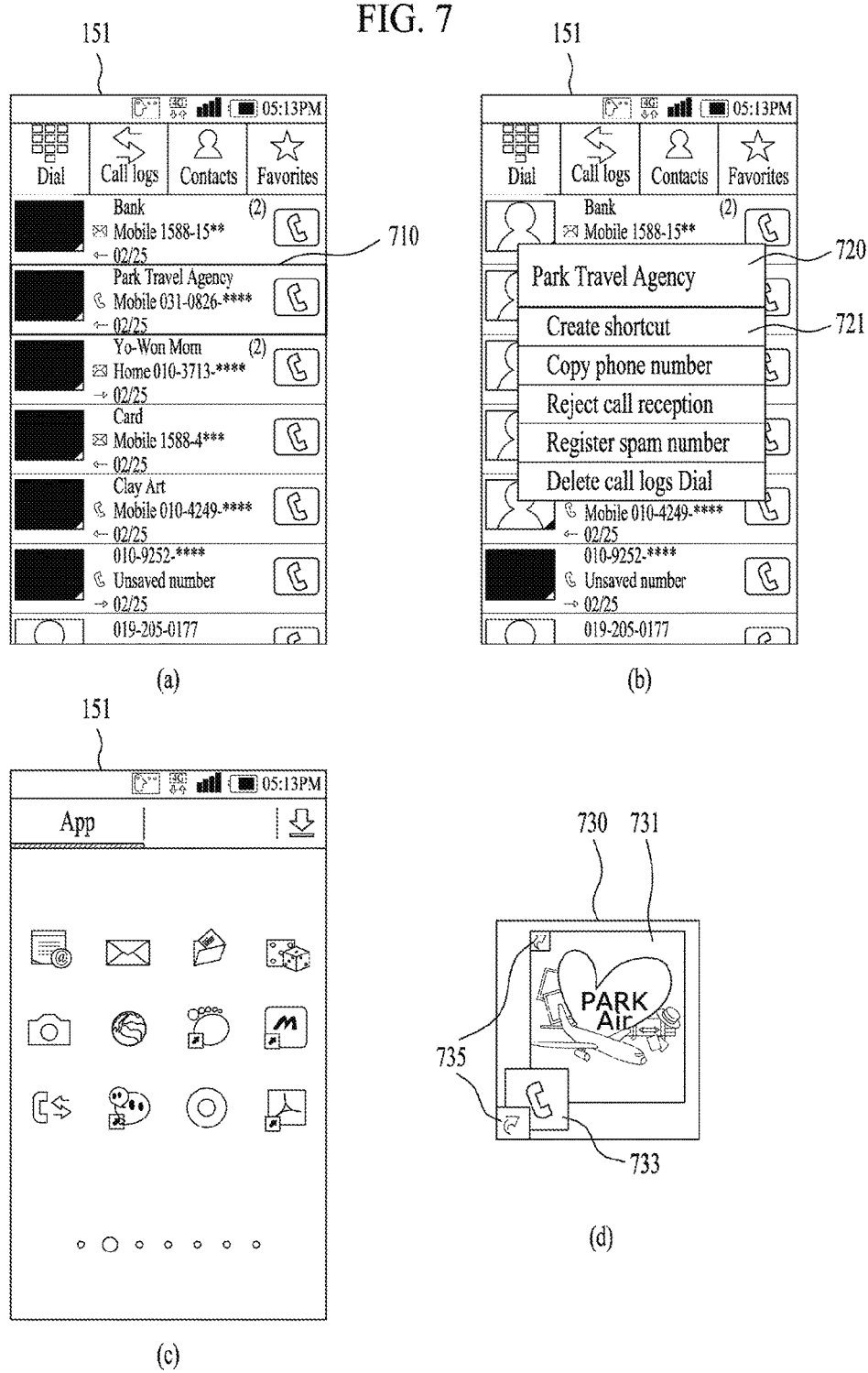
FIG. 7 is a diagram for another example of a method of creating a shortcut object in a mobile terminal according to one embodiment of the present invention.

FIG. 7 is a diagram for another example of a method of creating a shortcut object in a mobile terminal according to one embodiment of the present invention.

In FIG. 7, assume that a 2$^{nd}$ application includes a phone application. And, assume that information related to the 2$^{nd}$ application includes a contact item.

Referring to FIG. 7, while the phone application is running on the touchscreen 151, if a user pages a related menu by selecting a specific contact item 710 from a call log list [FIG. 7 (a)], a menu popup window 720 can be displayed [FIG. 7 (b)]. If the user selects a shortcut creation menu 721 from the menu popup window 720, an application list can be displayed [FIG. 7 (c)]. If an icon corresponding to a 1$^{st}$ application desired by the user is selected as a 1$^{st}$ object from the application list, a shortcut object (i.e., a 3$^{rd}$ object 730) corresponding to the selection can be created [FIG. 7 (d)]. In particular, the 1$^{st}$ object 731 is displayed at the center of the 3$^{rd}$ object 730 and a 2$^{nd}$ object corresponding to a 2$^{nd}$ application, i.e., an icon 733 corresponding to the phone application, can be displayed around the 1$^{st}$ object 731. In doing so, an indicator 735 indicating an execution of a shortcut function can be displayed on each of the icons.

According to the description with reference to FIG. 7, the 1$^{st}$ application is directly selected by the user. Alternatively, the controller 180 may be able to automatically determine the 1$^{st}$ application using information of a contact item. For instance, if 'travel agency' is included in the name of the contact item 710, the controller 180 can determine an application including an information related to a travel, e.g., a name 'air (or aviation)', as the 1$^{st}$ application. Moreover, if a shortcut object including a 1$^{st}$ object corresponding to a 1$^{st}$ application is previously created, a 2$^{nd}$ object can be added to the previously created shortcut object. In this case, as mentioned in the foregoing description with reference to FIG. 4, if an object corresponding to another application approaches the previously created shortcut object, a 2$^{nd}$ object can be configured additionally.

Thus, a configuration of a shortcut object including a plurality of 2$^{nd}$ objects is described in detail with reference to FIG. 8 as follows.

Figure 8:
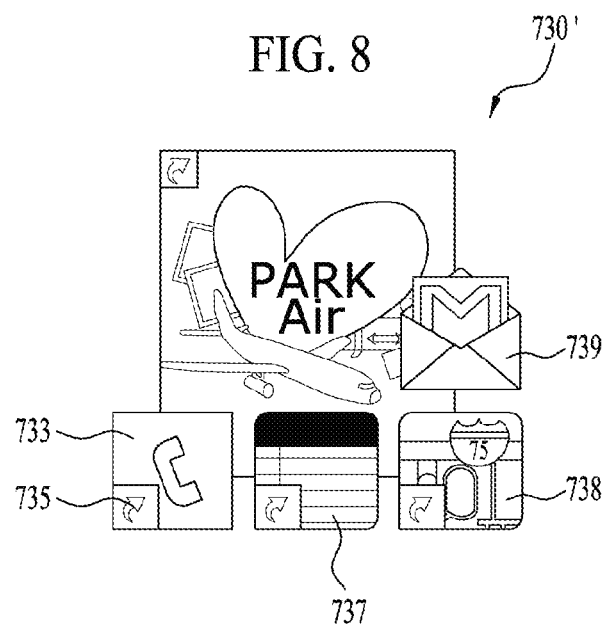
FIG. 8 is a diagram for another example of a configuration of a shortcut object created in a mobile terminal according to one embodiment of the present invention.

FIG. 8 is a diagram for another example of a configuration of a shortcut object created in a mobile terminal according to one embodiment of the present invention.

Referring to FIG. 8, a configuration 730' is formed in a manner that objects respectively corresponding to a plurality of applications are added to the shortcut object 730 created by the foregoing process described with reference to FIG. 7. In particular, if an object 737 corresponding to a memo application is dragged & dropped to the shortcut object 730, the controller 180 searches saved memos for a memo related to a travel and is then able to set the found memo as an information related to the memo application. Hence, the object 737 corresponding to the memo application can be added to the shortcut object 730. Hence, if the object 737 corresponding to the memo application is selected, the memo related to the travel can be directly displayed through the memo application.

Similarly, if an object 738 corresponding to a map application is selected, a map related to a travel place can be displayed. If an object 739 corresponding to an email application is selected, a mail transceived in association with a travel can be displayed through the email application. Hence, a user is able to gather and manage informations of different applications having a single common subject through a single shortcut object.

In the following description, side functions of a shortcut object are explained with reference to FIG. 9 and FIG. 10.

Figure 9:
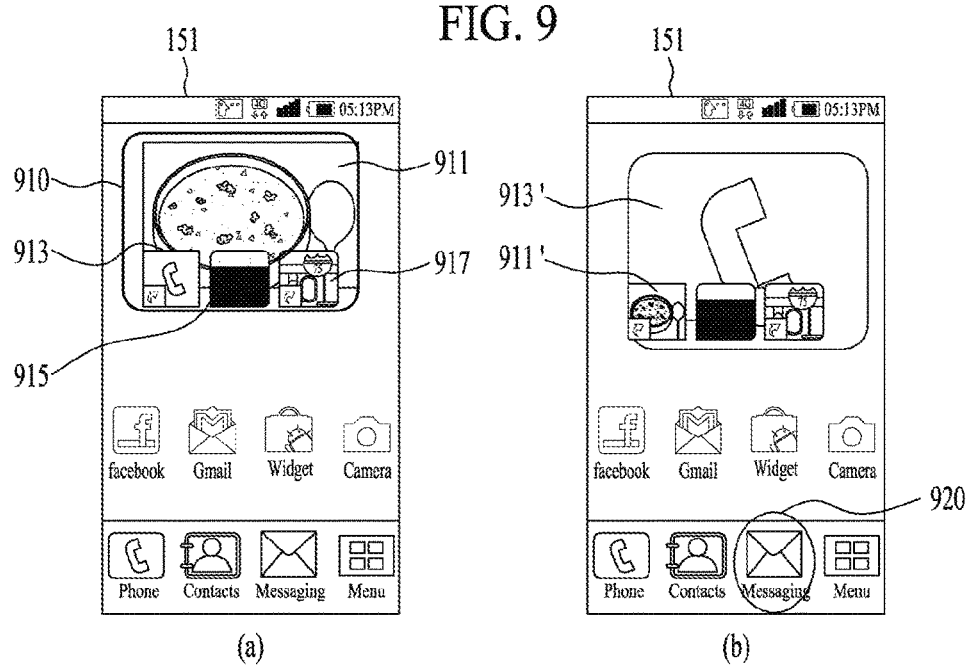
FIG. 9 is a diagram for one example of a method of switching objects to each other within a shortcut object in a mobile terminal according to one embodiment of the present invention.

FIG. 9 is a diagram for one example of a method of switching objects to each other within a shortcut object in a mobile terminal according to one embodiment of the present invention.

Referring to FIG. 9 (*a*), a food image 911 is displayed as a $1^{st}$ object at the center of a shortcut object 910. Moreover, an object 913 corresponding to a phone application, an object corresponding to a memo application, and an object 917 corresponding to a map application are displayed as $2^{nd}$ objects on the shortcut object 910 as well. In particular, the shortcut object 910 indicates a case that informations of applications related to a specific food in common are set. Hence, if the object 913 corresponding to the phone application is selected, a phone call can be made to a restaurant that provides the corresponding food. If the object 917 corresponding to the map application is selected, a location of a restaurant providing the corresponding food can be displayed.

In this situation, if a user intends to switch a location of the $1^{st}$ object and a location of one of the $2^{nd}$ objects to each other, the user can drag one object, of which location is desired to be switched, to another object within the shortcut object 910. If the object 913 corresponding to the phone application is dragged to the $1^{st}$ object 911, referring to FIG. 9 (*b*), locations of the two objects are switched to each other so that the object corresponding to the phone application can be displayed at the center of the shortcut object 910 [913']. Meanwhile, after the object corresponding to the phone application has been displayed at the center (i.e., after the object corresponding to the phone application has been set as the $1^{st}$ object), if a $2^{nd}$ object newly approaches the corresponding object (i.e., the $1^{st}$ object), a reference for the controller 180 to determine the information related to the $1^{st}$ object can be changed into contacts from images. For instance, if an object 920 corresponding to a text application is dragged to the shortcut object shown in FIG. 9 (*b*), the controller 180 can the information of the text application related to the $1^{st}$ object to a message exchanged with the corresponding contact item.

Figure 10:
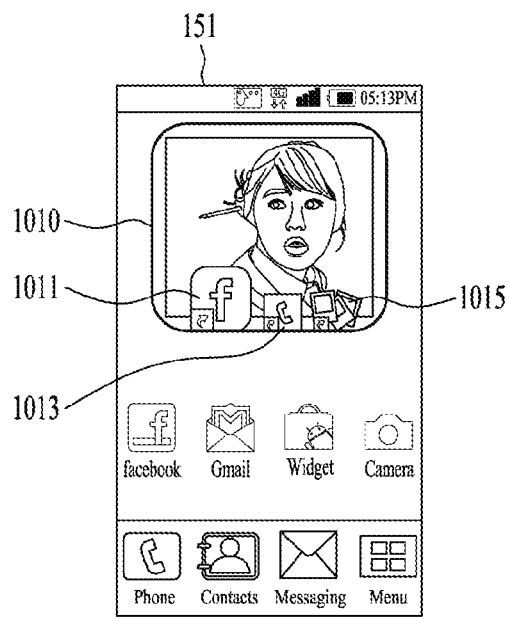
FIG. 10 is a diagram for one example of changing a configuration within a shortcut object in a mobile terminal according to one embodiment of the present invention.

FIG. 10 is a diagram for one example of changing a configuration within a shortcut object in a mobile terminal according to one embodiment of the present invention.

Referring to FIG. 10, sizes of a plurality of $2^{nd}$ objects 1011, 1013 and 1015 included in a shortcut object 1010 may differ from each other in frequency of use. In particular, the $2^{nd}$ object 1011 related to an SNS application, which is located at a left part of the shortcut object 1010, is most frequently selected. The $2^{nd}$ object 1013 related to a phone application, which is located at the center of the shortcut object 1010, is least frequently selected.

Link Between Contents Corresponding to Different Applications

A method according to another embodiment of the present invention is provided as follows. First of all, a link is established between contents respectively corresponding to different applications. Secondly, the contents can be paged conveniently and easily irrespective of types of the applications using the established link.

Figure 11A:
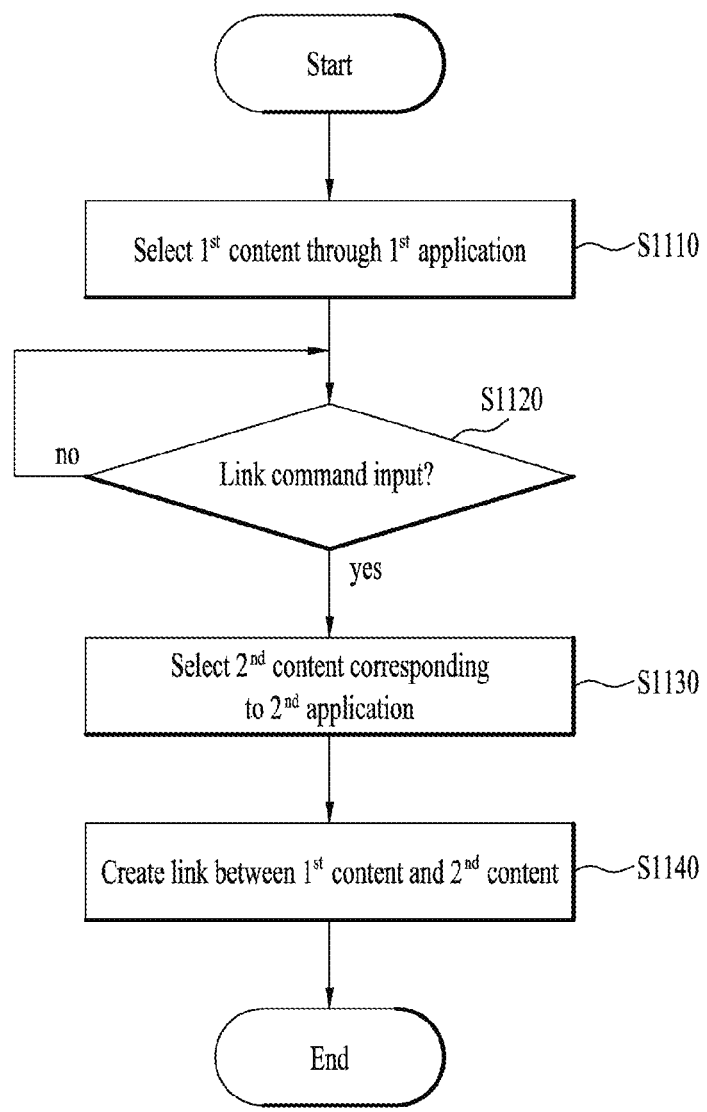
FIG. 11A is a diagram for one example of a process for creating a link between contents corresponding to different applications in a mobile terminal according to another embodiment of the present invention.

FIG. 11A is a diagram for one example of a process for creating a link between contents corresponding to different applications in a mobile terminal according to another embodiment of the present invention. And, FIG. 11B is a diagram for one example of a process for utilizing the created link in a mobile terminal according to another embodiment of the present invention.

Referring to FIG. 11A, a $1^{st}$ content can be selected through a $1^{st}$ application [S1110].

While the $1^{st}$ content is selected, if a link command for creating a link to a prescribed content different from the $1^{st}$ content [S1120], a $2^{nd}$ content corresponding to a $2^{nd}$ application can be selected [S1130].

In this case, the content may mean a storage unit of information, which can be created, read, played, modified, saved and/or deleted through the corresponding application, or a display object corresponding to the information storage unit. In particular, the content may include one of a schedule information, a contact information, a text, a webpage, an SNS posting, a multimedia file itself, a corresponding icon, a corresponding widget, and the like.

If the $2^{nd}$ content is selected, the controller 180 can establish a link between the $1^{st}$ content and the $2^{nd}$ content [S1140].

After the link has been established, referring to FIG. 11B, a content display command can be inputted [S1150]. In this case, no limitation is put on a type of the content display command unless the type enables the controller 180 to display a specific content through a corresponding application.

In response to the command, the controller 180 can determine whether a link to a specific content exists [S1160]. If the link established for the specific content exists, the controller 180 can control an indicator, which indicates the established link, to be displayed in a prescribed configuration when the specific content is displayed through the corresponding application [S1170].

If the displayed indicator is selected [S1180], the controller 180 can page the content corresponding to the selected indicator [S1190].

For instance, while the $1^{st}$ application is displayed through the $1^{st}$ application, if the link to the $2^{nd}$ content is selected, the controller 180 can control the $2^{nd}$ content to be directly displayed through the $2^{nd}$ application. On the other hand, while the $2^{nd}$ content is displayed, the link to the $1^{st}$ content is displayed. If the corresponding link is selected, the $1^{st}$ content can be directly displayed through the $1^{st}$ application. According to a related art, in order to display one content in the course of displaying another content, a corresponding application is activated in the first place and the corresponding content is then selected and displayed in the activated application inconveniently. Yet, according to the present invention, contents can be directly shifted by content unit without the inconvenience of the related art.

In the following description, one example of a method of creating and displaying a link between contents is explained in detail with reference to FIG. 12 and FIG. 13.

Figure 12:
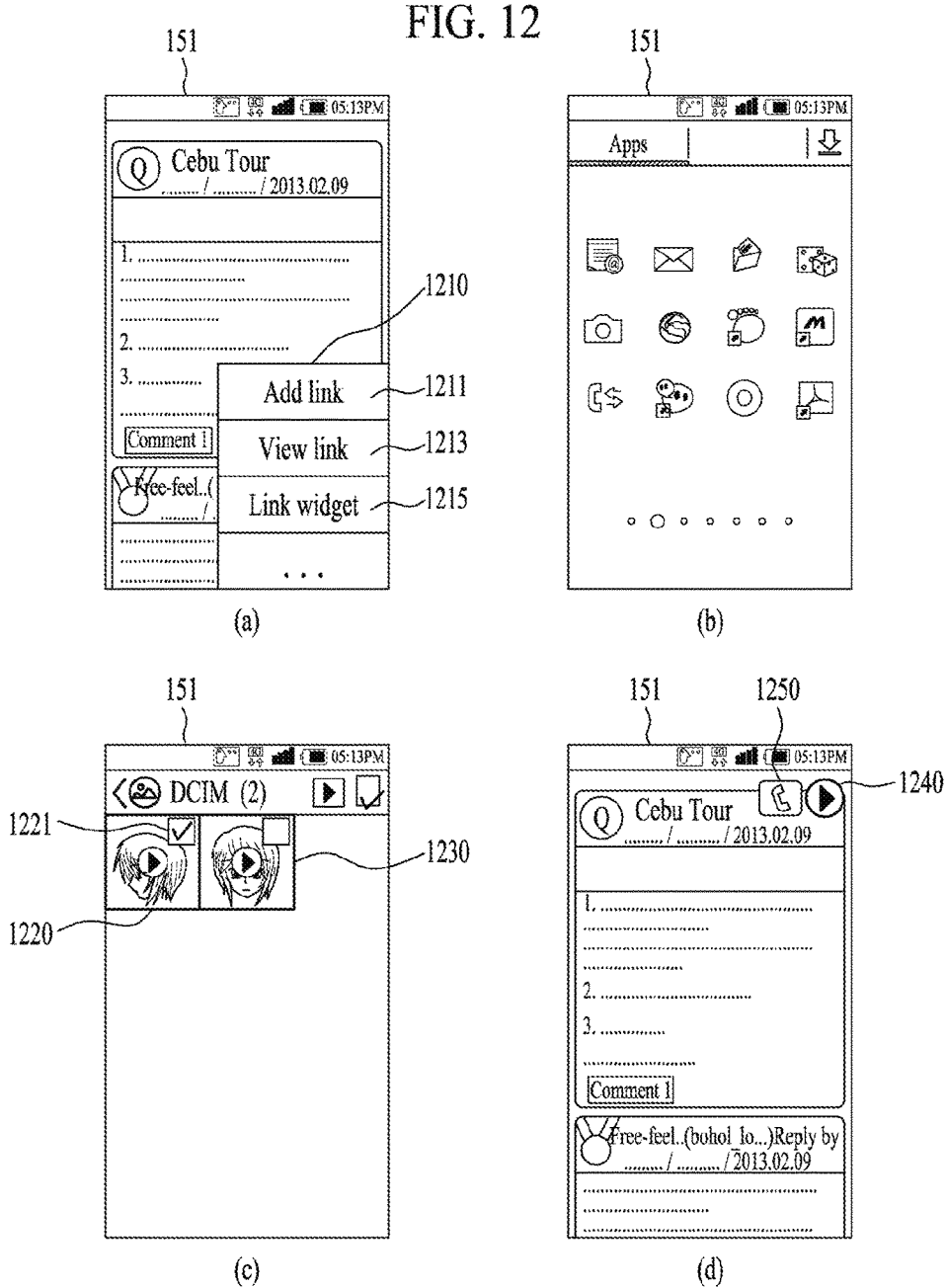
FIG. 12 is a diagram for one example of a method of creating a link between contents in a mobile terminal according to another embodiment of the present invention.

FIG. 12 is a diagram for one example of a method of creating a link between contents in a mobile terminal according to another embodiment of the present invention.

Referring to FIG. 12 (a), a specific webpage is currently displayed on the touchscreen 151 through a web browser application. In doing so, a link related menu 1210 can be displayed in response to a command input of a prescribed type. If a link add item 1211 is selected from the link related menu 1210, referring to FIG. 12 (b), an application list can be displayed. If a video play application is selected from the application list, referring to FIG. 12 (c), a list of video contents playable through the corresponding application can be displayed. In doing so, the video contents can be displayed as thumbnails 1220 and 1230. In doing so, if a user intends to link the left video to the webpage, the user can check a checkbox 1221 of the left thumbnail 1220.

Hence, the controller 180 determines that the selection of a $2^{nd}$ content is complete and is then able to establish a link between the webpage and the selected video.

FIG. 12 (d) shows a case that a contact is linked to the webpage content as well as the video, i.e., a case that 3 contents are linked to one another. In particular, after the link establishment has been completed, if the corresponding webpage is displayed again, an indicator 1240 corresponding to a selected video and an indicator 1250 corresponding to a contact can be displayed. In doing so, if the indicator 1240 corresponding to the video is selected, the video selected through the checkbox 1221 shown in FIG. 12 (c) can be played in direct. Therefore, as a user uses the link in switching contents respectively corresponding to different applications to each other, a desired content can be directly displayed without the inconvenience of activating another application by paging an application list and then selecting a corresponding content in the activated application.

Meanwhile, each of the indicators can be displayed all the time if the corresponding link is created. Alternatively, each of the indicators can be displayed only if a link view item 1213 is selected in the situation shown in FIG. 12 (a). Moreover, a configuration of each of the indicators may correspond to an icon of an application for displaying a linked content.

Figure 13:
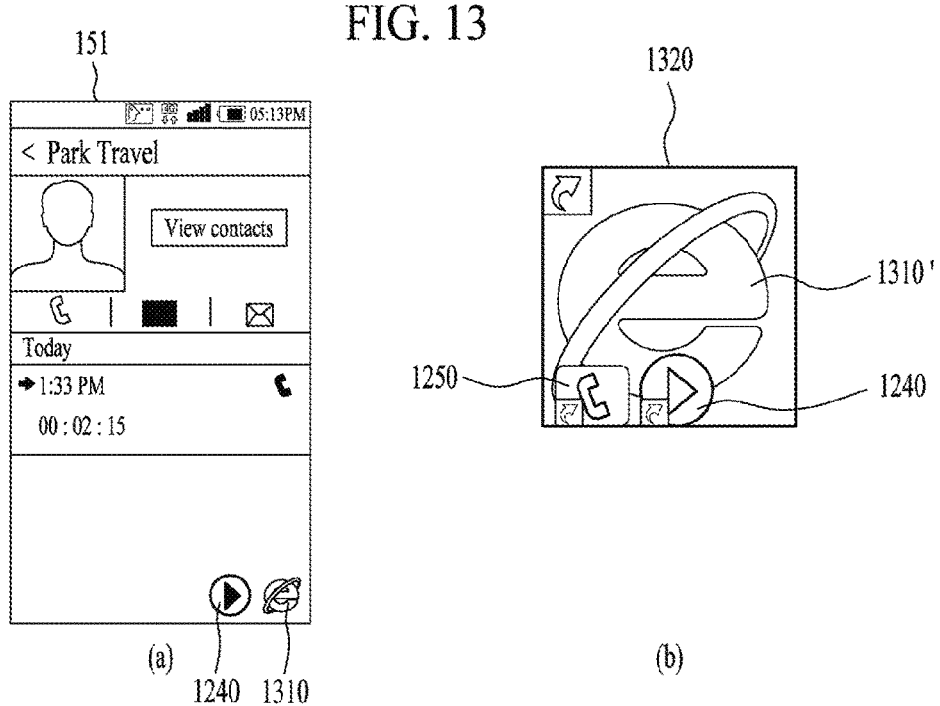
FIG. 13 is a diagram for one example of a configuration for displaying a link between contents in a mobile terminal according to another embodiment of the present invention.

FIG. 13 is a diagram for one example of a configuration for displaying a link between contents in a mobile terminal according to another embodiment of the present invention.

FIG. 13 (a) shows a case that the indicator 1250 corresponding to the contact is selected in the situation shown in FIG. 12 (d). In particular, information of a linked contact is displayed through a call application. And, an indicator 1240 corresponding to a video and an indicator 1310 corresponding to a webpage can be displayed on a prescribed region of the touchscreen 151. In doing so, if the indicator 1310 corresponding to the webpage is selected, the situation shown in FIG. 12 (d) can be entered again.

If a link widget item 1215 is selected in FIG. 12 (a), a widget similar to the $3^{rd}$ object described in the description of one embodiment of the present invention can be created from a prescribed location such as a home screen and the like. One example of the link widget created in the situation shown in FIG. 12 (d) is shown in FIG. 13 (b). Referring to FIG. 13 (b), a shortcut icon 1310' corresponding to an initially set content (i.e., webpage) is displayed at the center of a link widget 1320 and a shortcut icon 1240 corresponding to a video and a shortcut icon 1250 corresponding to a contact can be displayed nearby the shortcut icon 1310'. If each of the icons is selected, it is a matter of course that a content corresponding to the selected icon can be displayed through a corresponding icon.

Moreover, the above-described $3^{rd}$ object or link widget can be shared with an external terminal together with or separately from the related information or content.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
    displaying first content associated with a first application;
    selecting second content corresponding to the first content and associated with at least one second application, wherein the at least one second application includes a phone application;
    displaying a menu associated with the selected second content;
    selecting a shortcut creation menu corresponding to the at least one second application from the displayed menu;
    displaying a second link indicator associated with the first content;
    displaying a popup window including a phonebook menu, a direct contact input menu, and a cancel menu;
    displaying a contact list in response to a selection of the phonebook menu from the popup window; and
    displaying a virtual keypad in response to a selection of the direct contact input menu from the popup menu such that a direct input of contact information is received from the user via the virtual keypad.

2. The method of claim 1, further comprising:
    executing at least one function related to the second content based on the at least one second application.

3. The method of claim 2, wherein the executing the at least one function comprises at least one of:
    making a phone call corresponding to the selected second content; or
    sending a message corresponding to the selected second content.

4. The method of claim 1, wherein the first application includes at least one of a message application, a phonebook application, or an SNS application.

5. The method of claim 1, wherein each of the first content and the second content comprises:
information that is capable of being created, read, played, modified, stored or deleted via a corresponding application; and
a corresponding display object.

6. The method of claim 1, wherein the second content includes at least one of contact information, schedule information, a text, a webpage, an SNS posting, or a multimedia file.

7. The method of claim 1, further comprising:
determining at least one application associated with the first content using information of the first content;
creating a first link indicator associated with the determined at least one application; and
displaying the first link indicator.

8. The method of claim 7, further comprising:
receiving a selection of the first link indicator; and
displaying the first content via the determined at least one application.

9. A mobile terminal, comprising:
a touchscreen;
a memory; and
a controller configured to:
  display first content associated with a first application on the touchscreen;
  detect selection of second content corresponding to the first content and associated with at least one second application, wherein the at least one second application includes a phone application;
  display a menu associated with the selected second content on the touchscreen;
  detect a shortcut creation menu corresponding to the at least one second application from the displayed menu;
  display a second link indicator associated with the first content on the touchscreen;
  cause the touchscreen to display a popup window including a phonebook menu, a direct contact input menu, and a cancel menu;
  cause the touchscreen to display a contact list in response to a selection of the phonebook menu from the popup window; and
  cause the touchscreen to display a virtual keypad in response to a selection of the direct contact input menu from the popup window such that a direct input of contact information is received from the user via the virtual keypad.

10. The mobile terminal of claim 9, wherein the controller is further configured to:
execute at least one function related to the second content based on the at least one second application.

11. The mobile terminal of claim 10, wherein the controller is configured to execute at least one of:
making a phone call corresponding to the selected second content; or
sending a message corresponding to the selected second content.

12. The mobile terminal of claim 9, wherein the first application includes at least one of a message application, a phonebook application, or an SNS application.

13. The mobile terminal of claim 9, wherein each of the first content and the second content comprises:
information that is capable of being created, read, played, modified, stored or deleted via a corresponding application; and
a corresponding display object.

14. The mobile terminal of claim 9, wherein the second content includes at least one of contact information, schedule information, a text, a webpage, an SNS posting, or a multimedia file.

15. The mobile terminal of claim 9, wherein the controller is further configured to:
determine at least one application associated with the first content using information of the first content;
create a first link indicator associated with the determined at least one application; and
display the first link indicator on the touchscreen.

16. The mobile terminal of claim 15, wherein the controller is further configured to:
receive a selection of the first link indicator; and
cause the touchscreen to display the first content via the determined at least one application.

* * * * *